United States Patent [19]
Hanson

[11] Patent Number: 5,848,526
[45] Date of Patent: Dec. 15, 1998

[54] NOISE REDUCING STATOR ASSEMBLY FOR A GAS TURBINE ENGINE

[75] Inventor: Donald B. Hanson, Chester, Conn.

[73] Assignee: United Technologies Corporation, Hartford, Conn.

[21] Appl. No.: 780,075

[22] Filed: Dec. 23, 1996

Related U.S. Application Data

[60] Provisional application No. 60/028,907 Oct. 21, 1996.

[51] Int. Cl.$^6$ ................................................... F02C 7/045
[52] U.S. Cl. ........................... 60/226.1; 181/222; 415/119
[58] Field of Search ................................. 60/204, 226.1; 181/213, 214, 222; 415/119, 199.4, 199.5, 209.1, 209.2, 209.3, 209.4, 210.1, 211.2

[56] References Cited

U.S. PATENT DOCUMENTS

| | | | |
|---|---|---|---|
| 3,477,231 | 11/1969 | Paulson | 181/222 |
| 3,685,611 | 8/1972 | Duvvuri | 181/33 H |
| 3,692,141 | 9/1972 | Labussiere et al. | 181/33 E |
| 3,702,220 | 11/1972 | Medawar et al. | 415/119 |
| 3,820,628 | 6/1974 | Hanson | 181/33 HC |
| 4,116,584 | 9/1978 | Bammert et al. | 415/209.1 |
| 4,240,250 | 12/1980 | Harris | 415/119 |
| 4,284,170 | 8/1981 | Larson et al. | 181/213 |
| 4,372,110 | 2/1983 | Cheng | 60/262 |
| 4,384,634 | 5/1983 | Shuttleworth et al. | 181/213 |
| 4,433,751 | 2/1984 | Bonneau | 181/213 |
| 4,452,335 | 6/1984 | Mathews et al. | 181/214 |
| 4,723,626 | 2/1988 | Carr et al. | 181/213 |
| 4,817,756 | 4/1989 | Carr et al. | 181/214 |
| 4,909,346 | 3/1990 | Torkelson | 181/213 |
| 4,969,535 | 11/1990 | Arcas et al. | 181/213 |
| 5,014,815 | 5/1991 | Arcas et al. | 181/213 |
| 5,060,471 | 10/1991 | Torkelson | 60/262 |
| 5,092,425 | 3/1992 | Shaw, Jr. | 181/213 |
| 5,127,602 | 7/1992 | Batey et al. | 244/1 N |
| 5,167,118 | 12/1992 | Torkelson | 60/226.1 |
| 5,203,164 | 4/1993 | Paulson | 60/226.1 |

OTHER PUBLICATIONS

NASA Contractor Report, NASA CR 2323, pp. 1–90, Nov., 1973.

*Primary Examiner*—Louis J. Casaregola
*Attorney, Agent, or Firm*—Monica G. Krasinski

[57] ABSTRACT

A stator assembly for reducing noise in the outer most portion of the working medium flow path is disclosed. Various construction details are developed which relate to the reduction to noise within the outer twenty percent (20%) of the working medium flow path. In one particular embodiment, the number of radially extending surfaces in the outermost portion of the working medium flow path is reduced.

15 Claims, 6 Drawing Sheets

NOISE REDUCING STATOR ASSEMBLY FOR A GAS TURBINE ENGINE

CROSS REFERENCE TO RELATED APPLICATIONS

This application claims the benefit of U.S. Provisional Application No. 60/028,907, filed Oct. 21, 1996. This application also relates to U.S. application Ser. No. 08/780,072, filed on even date herewith for STATOR ASSEMBLY FOR THE FLOW PATH OF A GAS TURBINE ENGINE by Donald B. Hanson and commonly assigned to United Technologies Corporation.

TECHNICAL FIELD

The present invention relates generally to gas turbine engines having a working medium flow path, a rotor assembly which includes arrays of rotor blades and a stator assembly which includes arrays of stator vanes, and more particularly to a stator assembly of the type having an annular channel in the working medium flow path extending axially from a location between the array of rotor blades and the array of stator vanes for reducing noise in the working medium flow path.

DESCRIPTION OF THE PRIOR ART

A gas turbine engine, such as a gas turbine engine for an aircraft, includes a fan section, a compression section, a combustion section, and a turbine section. An annular flow path for working medium flow gases extends axially through the sections of the engine. The engine has a rotor assembly which includes arrays of rotor blades and a stator assembly which includes arrays of stator vanes.

The rotor assembly in the fan section has an axis of rotation and includes arrays of rotor blades angled with respect to the approaching flow. The blades are rotatable about the axis of rotation of the engine. An array of stator vanes is disposed downstream of the rotor array to receive and redirect the flow. The stator assembly includes an outer wall and an inner wall which extend circumferentially with respect to the flow path to bound the flow path for working medium gases.

As the working medium gases are flowed along the flow path, the gases are pressurized in the fan and compression section causing the temperature and the pressure of the gases to rise. The hot, pressurized gases are burned with fuel in the combustion section to add energy to the gases. These gases are expanded through the turbine section to produce useful work for pressurizing the gases in the fan and compression sections and thrust for propelling the gas turbine engine.

The rotor assembly extends axially through the engine to transfer the work of pressurization from the turbine section to the fan section. As the blades in the fan section are rotated about the axis of rotation, the blades do work on the gases to increase the pressure of the gases. The rotor blades increase the velocity of the gases and deflect the flow of gases from a general axial direction to the direction of rotation. The gases are then flowed past the rotor blades to the stator vanes which redirect the flow of gases to increase the axial component of velocity of the flow. Thus in the stators, the velocity of the gases decreases while the static pressure increases. By reorienting the flow, the stator vanes increase the recovery of the flow energy of the gases into thrust.

The flow of these gases through the engine and the passage of the blades through the gases are accompanied by the generation of acoustic energy or noise. In addition, the interaction of the stator components and other rotor components with the gases generates acoustic vibrations and noise.

Noise is a source of concern to the manufacturers of aircraft and aircraft engines. The manufacturers are especially concerned with the adverse effect of excessive levels of noise on passengers, aircraft personnel and residents in close proximity to airports. As a result of noise restrictions placed upon the use of aircraft in certain areas and at certain times, a need has existed and continues to exist for quieter aircraft engines.

The principal sources of noise in a jet engine are: jet or exhaust noise, core noise, and fan noise. Jet noise results from mixing of the high-velocity exhaust stream with the ambient air. A considerable amount of turbulence is generated when these two streams mix at different velocities, and hence the noise. With the introduction of the turbofan engine, there are two exhaust streams, therefore two sources of external noise. One source is the turbulent mixing of the fan exhaust stream with the ambient air. The other source is the turbulent mixing of the core exhaust stream with the fan exhaust stream and the ambient air.

Core noise consists of compressor noise, combustion noise and turbine noise. Compressor and turbine noise are caused by unsteady blade forces and fluid stresses when fluids are compressed or used to drive the turbines. Combustion noise results from the turbulence generated by the burning of fuel in the combustion chamber.

Fan noise is one of the major, if not the predominant, sources of noise in a highbypass ratio turbofan engine. Separate and distinct mechanisms contribute to fan noise which can be categorized into discrete tone noise and broadband noise. Discrete tone noise is a noise of a specific frequency from wakes of rotor blades and has a distinct signal or sound that can be heard above the background noises. Wakes from rotor blades, sweeping past stator vanes, produce pressure fluctuations on the vane surfaces; fluctuating aerodynamic pressure on the surfaces of airfoils, either stationary vanes or rotating blades, produces forces which in turn generate noise. Thus, the wake turbulent flow has to impact the radial airfoil surfaces to generate noise. Propagation of this noise from the engine relates to the number of vanes and blades of the engine, the geometry of walls bounding the flow path for working medium gases, velocity of the gases and rotor speed.

Broadband noise, rather than being at a discrete frequency, is distributed over a range of frequencies, such as the noise produced by the work of the engine on the gases which are flowed through the engine to produce thrust. Broadband noise is essentially the noise generated from the turbulence in the working medium gases as they pass across the rotor blade and stator vane surfaces. The effect is greater at the tip region of the rotor blade.

It is difficult to suppress fan noise because of the interdependence of the mechanisms which contribute to this noise and the basic aerodynamic operation of the fan. Much work has been done on designing turbofan and turbojet aircraft engines to reduce noise levels. The prior art contains many instances of structure adapted specifically for retrofit or original fit on a turbine engine to suppress engine noise. Typically, the noise suppression structure consists of sound attenuating liners applied to the nose cowl, the nose dome and the fan flow path components of the engine. In typical constructions the sound absorption material is used to line the inlet duct and nozzle of a turbojet or turbofan engine in order to suppress the noise generated within the flow path. However, significant aerodynamic losses result from the addition of enough noise suppression structure to provide acceptable levels of tonal and broadband noise.

One approach to reducing noise levels is discussed in U.S. Pat. No. 3,820,628 entitled "Sound Suppression Means For Rotating Machinery", issued to the present inventor Donald B. Hanson and assigned to the assignee of this application. In Hanson, boundary layer control is used in a fan to reduce the noise generated in the fan flow path by structures such as flow splitters, inlet guide vanes, fan blading coming into contact with the airstream. The strata of boundary layer in the fan flow path adjacent the structures, whether inlet guide vanes, outlet guide vanes, or flow splitters, communicate with openings formed in the structures. The structures are designed to contain sound suppression means or material. The working medium gases are flowed through the sound suppression means by a suction pump so as to remove the boundary layer and thereby reduce the attendant wakes.

This above art notwithstanding, scientists and engineers working under the direction of Applicant's assignee are seeking to reduce the level of noise for a given aerodynamic loss in a gas turbine engine.

SUMMARY OF THE INVENTION

This invention is in part predicated on the recognition that decreasing the number of radial airfoil surfaces in the outermost portion of the working medium flow path decreases recovery of thrust but provides for a greater reduction in noise due to the nature of the flow for a given decrease in thrust than does eliminating such surfaces at other locations in the working medium flow path or, in some instances, using an extensive amount of sound absorption structure.

According to the present invention, a gas turbine engine having a working medium flow path includes an array of rotor blades, an intermediate wall downstream of the rotor blades extending circumferentially and dividing the working medium flow path into an inner annular channel and an outer annular channel, the intermediate wall being inwardly supported by an array of stator vanes extending across the inner channel and being outwardly supported by a lesser number of struts extending across the outer channel, the outer annular channel extending radially and circumferentially within the outermost twenty percent (20%) of the working medium flow path for trapping a portion of the wake turbulent flow.

A primary feature of the present invention is an array of rotor blades. Another feature is an array of a number of stator vanes spaced axially downstream from the rotor blades. Another feature is an array of a number of struts spaced axially downstream of the array of rotor blades whose number is less than the number of stator vanes. Another feature is a circumferentially extending intermediate wall. The intermediate wall divides the stator array into an inner and outer annular channel. The intermediate wall is inwardly attached to the stator vanes extending across the inner channel. The intermediate wall is outwardly attached to a number of struts extending across the outer channel. Another feature is an annular flow path for working medium gases which extends through the array of rotor blades and array of stator vanes. The annular channels extend axially from a location disposed between the rotor blades and stator vanes. The outer annular channel extends radially and circumferentially within the outermost twenty percent (20%) of the working medium flow path. The outer annular channel is bounded by an outer duct wall and the intermediate wall spaced radially inward from the outer duct wall. The outer annular channel has an actual axial length $L_C$ parallel to the direction of flow and a radial height $H_C$ perpendicular to the direction of flow. In one detailed embodiment the outer annular channel has a ratio of $L_C/H_C$ greater than three (3) with acoustic treatment present on at least one wall. In one detailed embodiment the normalized length $L_n$ of the intermediate wall is at least fifteen (15) times greater than the normalized height $H_n$ of the outer annular chamber. In one detailed embodiment an example of a strut is one having an aerodynamic contour which is identical to a stator vane. In one detailed embodiment there is at least one strut in each quadrant of the annular channel. In another detailed embodiment the struts are circumferentially spaced by equal distances in the outer annular channel. In one detailed embodiment the struts are an integral portion of the stator vanes.

A primary advantage of the present invention is the level of noise in a gas turbine engine associated with the interaction of the wake turbulent flow with the leading edges of struts which results from the number of struts in the outer annular channel upon which the wake turbulent flow from the tip of the rotor blades may impact. Another advantage is the level of aerodynamic efficiency of the engine which results from the wake turbulent flow from the tip region of the rotor blades impacting a fewer number of radial airfoil surfaces and the effect on thrust of drag losses from such flow. Another advantage is the ease of construction which results from the intermediate wall being attached to both the stators and struts. Another advantage is the ease of installation and effectiveness of noise treatment in the intermediate wall due to the fewer number of struts in the outer annular channel which provides for fewer areas that the sound absorption structure needs to be bonded to.

The foregoing and other objects, features and advantages of the present invention will become more apparent in the light of the following detailed description of the best mode for carrying out the invention and from the accompanying drawings which illustrate an embodiment of the invention.

BEST MODE FOR CARRYING OUT THE INVENTION

Figure 1:
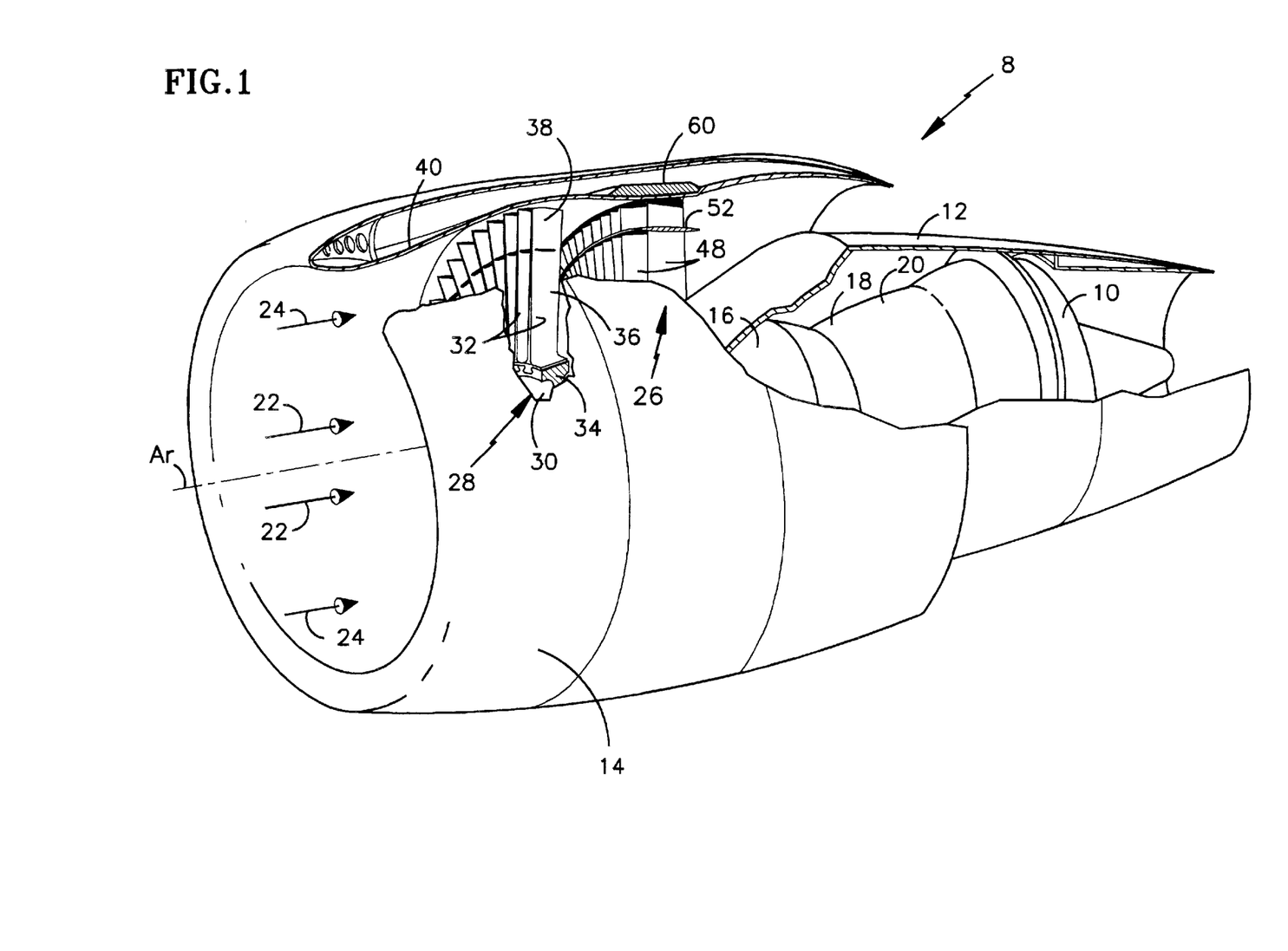
FIG. 1 is a partial perspective view of a gas turbine powerplant of the axial flow, turbofan type which includes a gas turbine engine and a nacelle with portions of the nacelle and engine broken away to show a portion of the secondary flow path for working medium gases and an array of rotor blades and stator vanes.

FIG. 1 shows a gas turbine powerplant 8 of the axial flow, turbofan type having an axis of rotation. The powerplant includes an engine 10 and a nacelle 12. The engine is formed of a fan section 14, a compressor section 16, a combustion section 18 and a turbine section 20. A primary flow path 22 for working medium gases extends rearwardly through these sections. A secondary flow path 24 for working medium gases is outwardly of the primary flow path.

The nacelle 12 circumscribes the engine and is adapted to both support and position the engine from a support structure such as an aircraft wing. The engine 10 and nacelle include a stator assembly 26 extending circumferentially about an axis of rotation $A_r$ to bound the working medium flow path As used herein, the term "engine" includes the engine and portions of the nacelle integral with the engine which bounds the secondary flow path. A rotor assembly 28 is disposed about the axis of rotation $A_r$. The rotor assembly includes a rotor disk 30 and a plurality of rotor blades 32. Each rotor blade extends outwardly from the disk across the working medium flow paths 22, 24 into proximity with the stator assembly.

Figure 2:
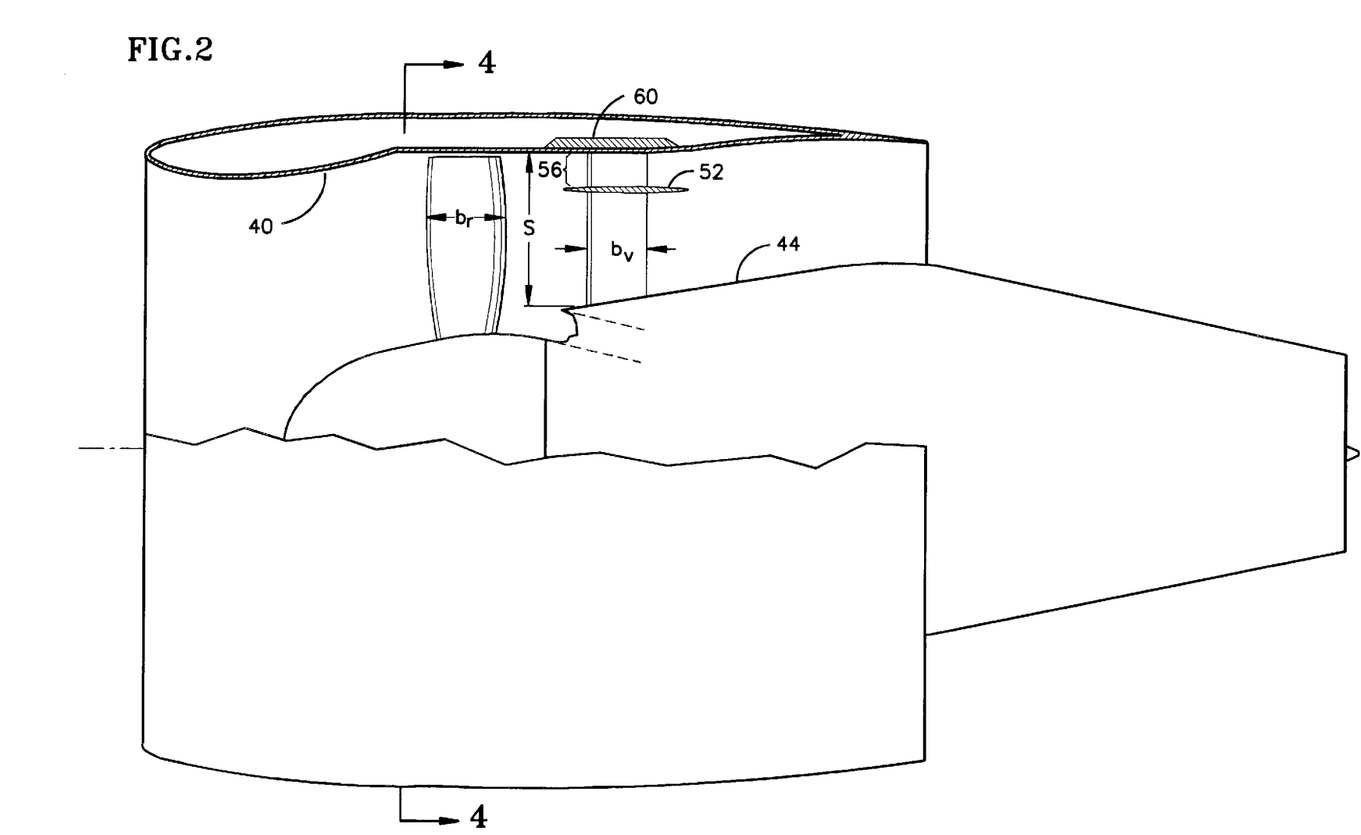
FIG. 2 is a side elevation view of the gas turbine powerplant shown in FIG. 1 with portions of the powerplant broken away for clarity.

FIG. 2 is a side elevation view of the stator assembly of the axial flow gas turbine engine 10 shown in FIG. 1. The stator assembly 26 includes an outer wall 40 which extends circumferentially about the axis of rotation of the engine. The outer wall outwardly bounds the annular flow path for working medium gases. An inner wall 44 is spaced radially inwardly from the outer wall. The inner wall extends circumferentially about the axis of rotation and inwardly bounds the flow path for working medium gases. As shown, the annular flow path 24 for working medium gases has a height $H_D$ as measured at the inlet to the stator assembly.

Each rotor blade 32 of the rotor assembly has a root region 34, a mid-span region 36 and a tip region 38. The tip region is in close proximity with the outer wall. The rotor blade has a chord length $b_r$ as measured in the axial direction and radially at the mid-span location. An array of stator vanes 48 is spaced axially downstream from the array of rotor blades. Each stator vane extends radially inwardly from the outer wall to the inner wall across the annular flow path 24. The stator vane has a chord length $b_v$ as measured in the axial direction and radially at the mid-span location. The stator vane has a radial span S as measured at the leading edge.

An intermediate wall 52 extends axially to split the flow path. The intermediate wall is spaced radially inwardly from the outer wall 40 leaving an annular channel 56 therebetween.

Figure 3:
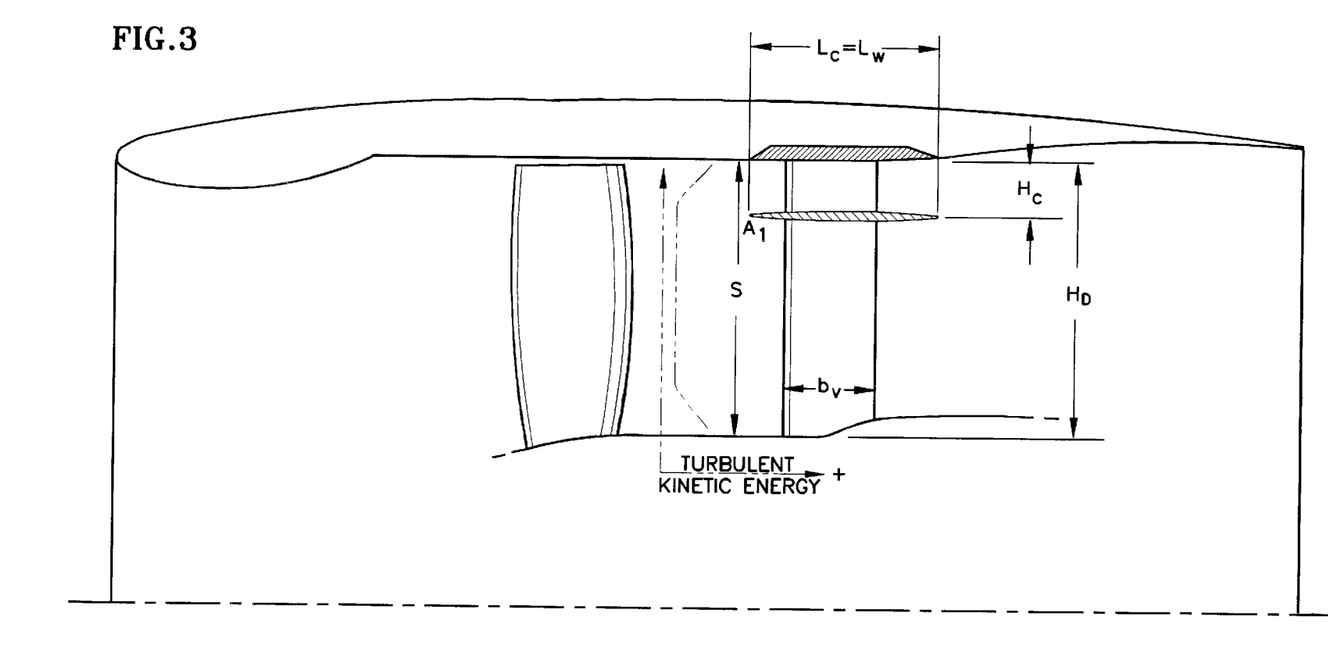
FIG. 3 is an enlarged view of a portion of the gas turbine powerplant shown in FIG. 2 and shows diagrammatically the variation in turbulent kinetic energy of the flow as a function of spanwise location.

FIG. 3 is an enlarged view of a portion of the gas turbine engine 10 shown in FIG. 2 showing in more detail the relationship of the annular flow path to the components of the stator assembly. The annular channel 56 is outwardly bounded by the outer wall 40 and inwardly bounded by the intermediate wall 52. The intermediate wall is integrally attached to at least one of the stator vanes 48. The intermediate wall has a length axial $L_w$, and a normalized length $L_n$ that is equal to the axial length $L_w$ divided by the axial chord $b_v$ of the stator ($L_n = L_w/b_v$). The ratio of the normalized length $L_n$ is at least fifteen (15) times greater than the normalized height $H_n$ of the annular channel 56 by reason of the height of the channel.

The annular channel 56 extends axially from a first location $A_1$ disposed between the blades 32 and vanes 48 and extends radially and circumferentially within the outermost twenty percent (20%) of the working medium flow path 24. The annular channel has a normalized height $H_n$ that is equal to the actual radial height of the channel divided by the radial span of the stator vanes ($H_n = H_C/S$). The channel has an inlet with a leading edge spaced axially from the rotor blades such that the distance between the rotor blades and the leading edge of the inlet to the annular channel at the first location is less than four chord lengths ($4b_r$) of the rotor blade. The annular channel has an actual axial length $L_C$ as measured axially. In the embodiment shown, the distance is the same as measured substantially parallel to the flow. The channel has an actual radial height that is less than or equal to twenty percent (20%) of the height $H_D$ of the working medium flow path ($H_C \leq 0.20 H_D$) as measured radially. In the embodiment shown, the distance is the same as measured substantially perpendicular to the flow. The aspect ratio of the channel is equal to the actual axial length $L_C$ of channel to the actual radial height $H_C$ of channel. This aspect ratio of the channel is greater than three ($L_C/H_C > 3$).

At least one of the walls bounding the annular channel 56 has sound permeable structure 60 disposed therein. In the embodiment shown, both the walls 40, 52 bounding the annular channel have sound permeable structure disposed therein.

Figure 4:
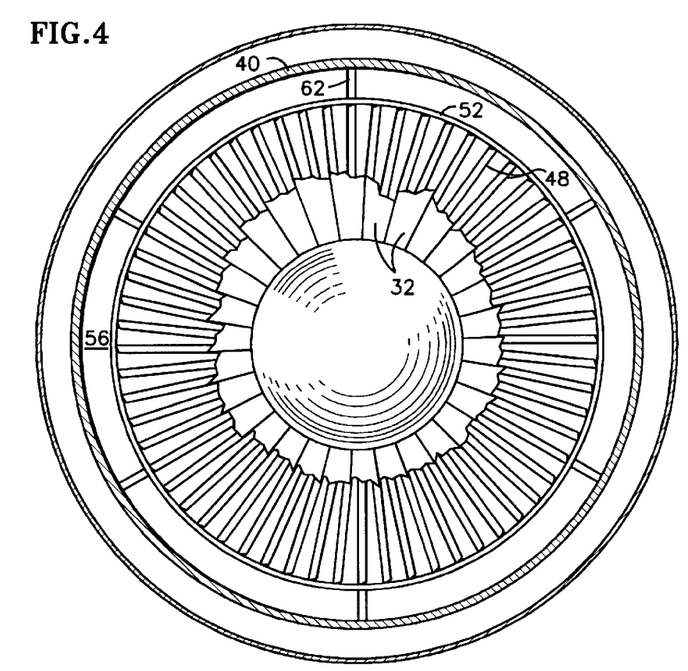
FIG. 4 is a cross-sectional view of an embodiment of the powerplant shown in FIG. 2 corresponding to a view taken along the lines 4—4 of FIG. 2.

FIG. 4 is a cross-sectional view of an embodiment of the engine shown in FIG. 2 corresponding to a view taken along the lines 4—4 of FIG. 2. In this embodiment an array of a number of stator vanes 48 extends radially inwardly from the intermediate wall 52 across the annular flow path 24 to the inner wall 44. The array of stator vanes is spaced axially downstream from the rotor blades 32. Each stator vane has a chord length by as measured in the axial direction and a radial span S as measured at the leading edge. At least one of the stator vanes is adapted to engage the intermediate wall.

An array of a number of struts 62 extends radially outwardly from the intermediate wall 52 across the annular flow path 24 to the outer wall 40. The number of struts is less than the number of vanes supporting the intermediate wall. The array of struts is axially downstream of the array of rotor blades 32. The intermediate wall is outwardly attached and supported by at least one strut extending across the annular channel. The intermediate wall is integrally attached to and inwardly supported by at least one stator vane 48 extending radially across the annular flow path. One example of a strut is one having an aerodynamic contour which is identical to the stator vane.

Figure 5:
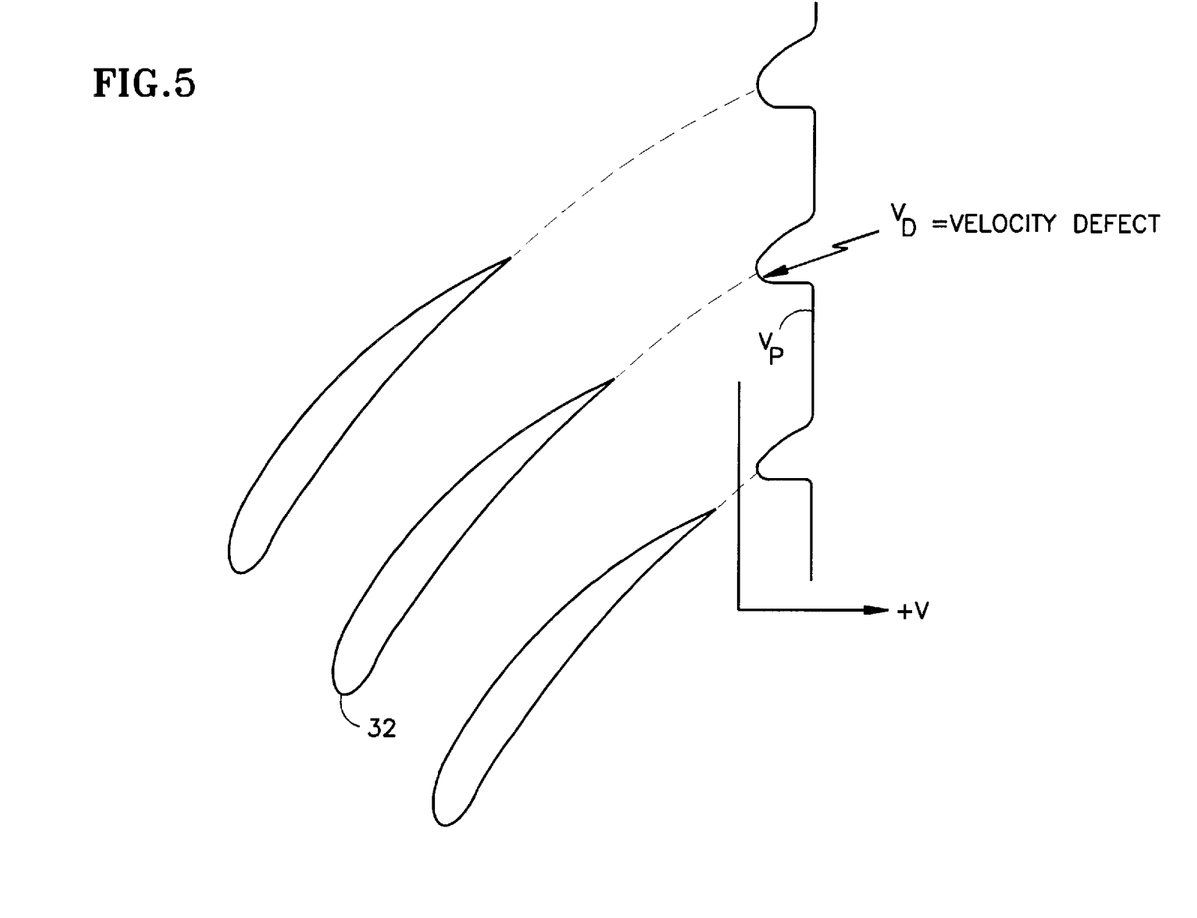
FIG. 5 is a developed view schematically showing the wake velocity profile of the tip region in the axial direction.
Figure 6:
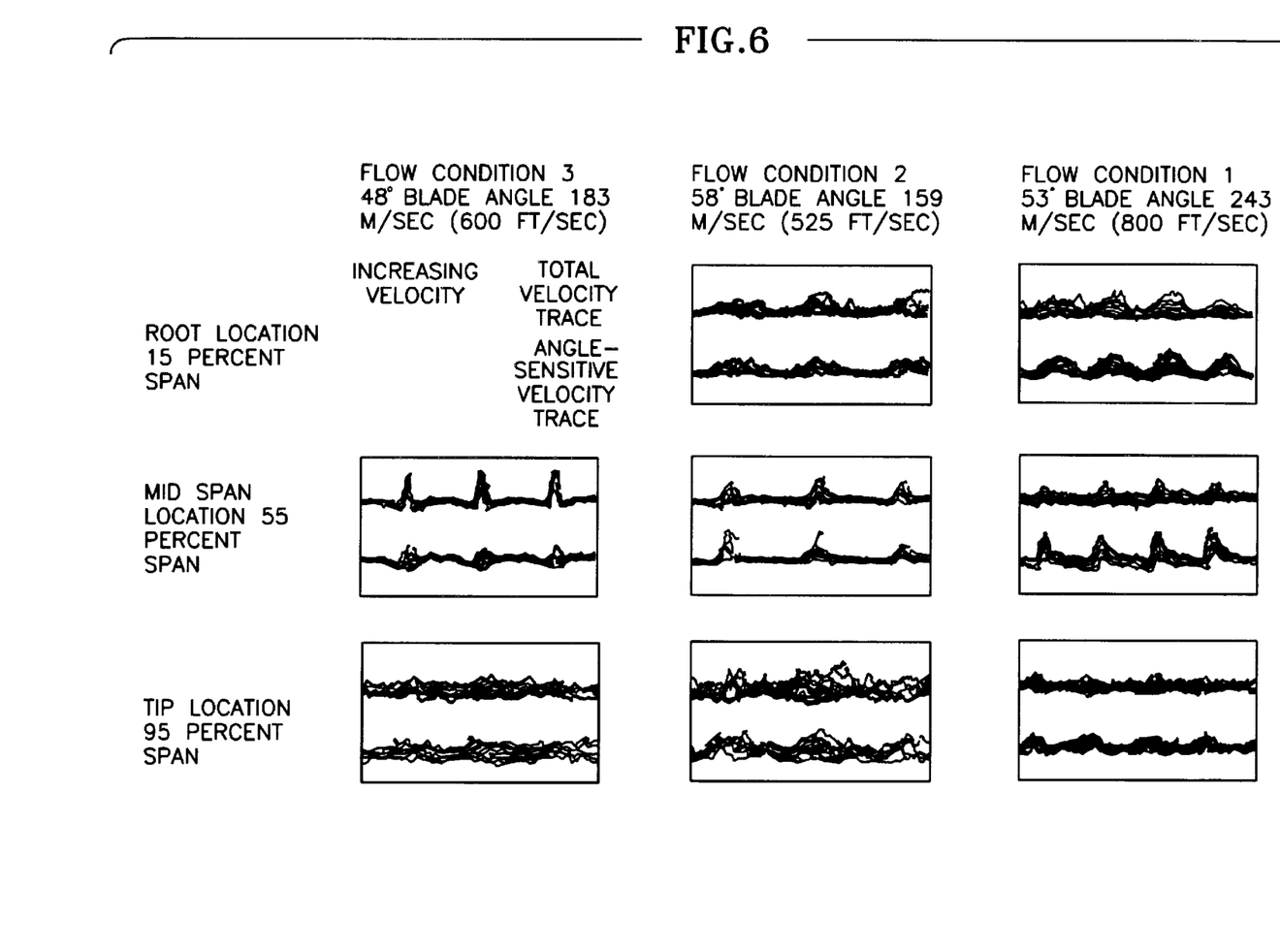
FIG. 6 is a graph of oscilloscope traces from a hot wire probe showing that the wake turbulent flow varies dramatically across the span of the stator inlet being most turbulent at the tip region.

FIG. 5 is a developed view schematically showing the wake velocity profile of the tip region of the rotor blades. FIG. 6 relates to the wake turbulent flow and shows how this flow varies across the span of the stator inlet. Both FIG. 5 and FIG. 6 are discussed below.

Figure 7:
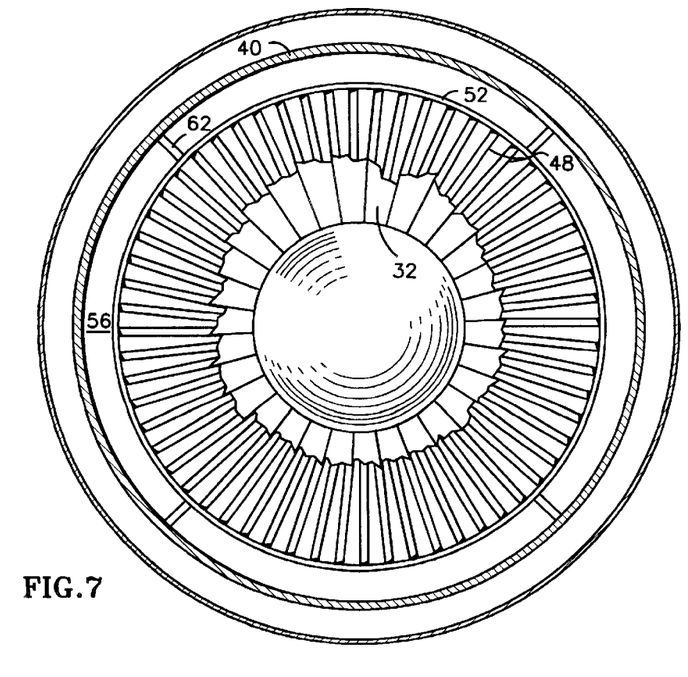
FIG. 7 is a cross-sectional view of an alternate embodiment of the powerplant shown in FIG. 2 corresponding to a view taken along the lines 4—4 of FIG. 2.

FIG. 7 is a cross-sectional view of an embodiment of the engine shown in FIG. 2 corresponding to a view taken along the lines 4—4 of FIG. 2. As shown in FIG. 7, the annular channel 56 has four (4) quadrants. At least one strut 62 is disposed in each quadrant of the annular channel. The struts do not have to be circumferentially spaced by equal distances in the annular channel.

During operation of the gas turbine engine, the working medium gases are compressed in the fan section 14 and the compressor section 16. The gases are burned with fuel in the combustion section 18 to add energy to the gases. The hot, high pressure gases are expanded through the turbine section 20 to produce thrust and useful work. The work done by expanding gases drives rotor assemblies in the engine, such as the rotor assembly 28 extending to the fan section, about the axis of rotation $A_r$.

The gases are flowed along the working medium flow path at high velocities into the rotor assembly 28. As the rotor assembly is rotated at high speed, the rotor blades 32 travel at high velocities about the axis of rotation to compress the working medium gases in the primary flow path 22 and the secondary flow path 24. The rotor blades passing through the gases at high velocities generate acoustic energy or noise.

As each rotor blade 32 passes through the gases, the blade leaves a wake or track of turbulent gases behind the blade which is commonly referred to as wake turbulent flow. In addition, the tip region 38 has secondary flow patterns adjacent the tips of the rotor blades due to the interaction of the rotor blade with the outer wall boundary layer 40. This interaction introduces further turbulence into the wake turbulent flow at the tip region. This wake turbulent flow from rotor blades 32 sweeping past stator vanes 48 and struts 62 produces pressure fluctuations on the vane and strut surfaces. Fluctuating aerodynamic pressure on the surfaces of the stator vanes and struts, produces forces which in turn generates additional noise.

FIG. 6 shows oscilloscope traces from a hot wire probe showing that the characteristics of the wake turbulent flow vary dramatically with time and with radial location across the span of the stator 48 inlet. The modulation in amplitude and time is due to the turbulence associated with this flow. In particular, FIG. 6 shows the traces for three flow conditions at the root region 34, mid-span region 36, and tip region 38 of the rotor blade.

At the mid-span region 36 the wakes of turbulent flow are seen to be isolated or distinct. A periodic pattern can be seen in this region. In the root region 34 the wakes are nearly merged and highly turbulent; however, a periodic pattern in this region can also be ascertained. As shown in FIG. 6, the wake turbulent flow is most turbulent at the tip region 38. At the tip region, the individual blade wakes are nearly indistinguishable in the turbulence. No periodic pattern can be ascertained in the tip region of the rotor blade 32.

The characteristics of the wake turbulent flow have been studied to understand the role of this flow in the generation of noise at the stator vanes 48. Wake turbulent flow has two components: a random component and a steady component. The steady component is shown in FIG. 5 which is a developed view schematically showing the wake velocity profile $V_P$ of the tip region in the axial direction. In the velocity profile, velocity defects $V_D$ are localized areas of decreased velocity corresponding to the tip regions 38 of the rotor blades 32. These velocity defects comprise the steady component of the flow. The steady component is also commonly referred to as the harmonic wake component.

The random component of the wake turbulent flow is represented by the turbulent kinetic energy plotted in FIG. 3. As shown in FIG. 3, the turbulent kinetic energy varies dramatically across the span of the stator 48 inlet. The turbulent kinetic energy is much greater at the root region 34 and tip region 38 of the rotor blade 32 than at the mid-span region 36 of the rotor blade. The turbulent kinetic energy present in the root region of the rotor blades is attenuated by being absorbed into the low pressure compressor. The random component is also commonly referred to as the broadband wake component.

The two components of the wake turbulent flow, harmonic (steady) and broadband (random) components, are related to components of the noise spectrum. The harmonic wake component causes harmonic or tonal noise and the broadband wake component causes broadband noise.

As mentioned earlier, turbulent flow produces noise when interacting with each of the stator vanes 48 and the adjacent structure; and the flow produces drag losses. Due to its turbulent nature, the flow in the outermost portion has high aerodynamic losses as compared to the remainder of the flow as dynamic pressure is converted to static pressure (thrust). Accordingly, this tip flow provides a smaller contribution to thrust than does a like amount of the remainder of the flow. And due to its turbulent nature, the flow in the outermost portion provides a large contribution to fan noise. It is therefore aerodynamically efficient to decrease the excessive noise energy in this outer region while accepting the reduced thrust potential.

Accordingly, as shown in FIG. 4 and FIG. 7, the number of radial surfaces in the outer annular channel may be reduced to a lesser number of surfaces than the number of radially extending stator vanes. This results in reduced thrust because there are fewer radially extending surfaces downstream of the rotor blades to redirect the flow of gases to increase the axial component of velocity of the flow. There is a decrease in recovery of the static pressure of the gases and therefore a decrease in generation of thrust in the outer annular channel as compared to flow inwardly of the intermediate wall.

By accepting a reduced amount of thrust, a fewer number of struts 62 are provided such that the sound energy discharged from the tip region of the rotor blades impacts on a smaller number of radially extending surfaces generating a decreased amount of noise. Therefore, the penalty in thrust is not as high when the wake turbulent flow at the tip region, after impacting with a fewer number of radially extending surfaces, is discharged from the engine.

In addition, the most turbulent portion of wake can be treated with sound absorbing structure 60 to reduce noise before the noise escapes into the general fan flow path. This is accomplished by at least one of the walls bounding the annular channel 56 having sound permeable structure disposed therein.

In summary, because the outermost portion of the flow does not provide as great a contribution to thrust because of its turbulence as does flow inwardly of the wake region, treatment to dissipate the acoustic energy within the outermost twenty percent (20%) does not interfere with engine thrust as would such treatment elsewhere along the span. The number of leading edges interacting with the turbulent flow are reduced in the annular channel 56 which reduces thrust. However, the wake turbulent flow does not impact many strut 62 surfaces and less acoustic energy is generated.

Although the invention has been shown and described with respect to detailed embodiments thereof, it should be understood by those skilled in the art that various changes in form and detail thereof may be made without departing from the spirit and the scope of the claimed invention.

What is claimed is:

1. A stator assembly for a gas turbine engine which has an axis of rotation $A_r$ and an annular flow path for working medium gases disposed about the axis of rotation, the stator assembly extending circumferentially about the axis of rotation of the engine and bounding the flow path, comprising an outer wall extending circumferentially about the axis of rotation and outwardly bounding the annular flow path for working medium gases, an inner wall spaced radially inwardly from the outer wall, the inner wall extending circumferentially about the axis of rotation and inwardly bounding the working medium gases, an array of rotor blades, each rotor blade extending radially outwardly across the annular flow path and having a tip region such that the tip region is in close proximity with the outer wall, the stator assembly characterized by:

an array of stator vanes having a number of stator vanes that are spaced axially downstream from the array of rotor blades, each stator vane extending radially outwardly from the inner wall across at least a portion of the annular flow path, at least one of which is adapted to integrally attach an intermediate wall;

an array of struts having a number of struts that are spaced axially downstream from the array of rotor blades, each strut extending radially inwardly from the outer wall across at least a portion of the annular flow path and at least one of which being adapted to attach an intermediate wall;

a circumferentially extending intermediate wail spaced radially inwardly from the outer wall leaving an annular channel therebetween, the intermediate wall being integrally attached to and inwardly supported by at least one of said stator vanes extending radially across the annular flow path and being integrally attached to and outwardly supported by a number of struts extending across the annular channel, said annular channel being outwardly bounded by the outer wall and inwardly bounded by the intermediate wall and extending axially from a location disposed between the blades and vanes and said channel extending radially and circumferentially and disposed entirely within the outermost twenty percent (20%) of the working medium flow path;

wherein the inner and outer wall of the annular channel capture turbulent flow discharged into the outer portion of the flow path from the tip region of the rotor blades, and wherein the number of struts is less than the number of vanes to provide a fewer number of radially extending surfaces upon which the flow may impact in the outermost twenty percent (20%) of the working medium flow path.

2. The stator assembly of claim 1 characterized by the array of struts further having at least four (4) struts.

3. The stator assembly of claim 1 characterized by at least one of the struts further having an aerodynamic contour which is identical to a stator vane.

4. The stator assembly of claim 2 wherein the annular channel further has four (4) quadrants and characterized by at least one strut being disposed in each quadrant of the annular channel.

5. The stator assembly of claim 2 characterized further by the struts being circumferentially spaced by equal distances in the annular channel.

6. The stator assembly of claim 3 characterized by the aerodynamically contoured struts further being integrally formed with the stator vanes such that the aerodynamic contour of the stator vanes extend radially outwardly to the outer wall.

7. The stator assembly of claim 3 wherein the annular channel further has four (4) quadrants and characterized by at least one strut being disposed in each quadrant of the annular channel.

8. The stator assembly of claim 3 characterized further by the struts being circumferentially spaced by equal distances in the annular channel.

9. The stator assembly of claim 4 characterized further by at least one of the walls bounding the annular channel having sound absorption structure disposed therein.

10. The stator assembly of claim 5 characterized further by at least one of the walls bounding the annular channel having sound absorption structure disposed therein.

11. The stator assembly of claim 6 characterized further by at least one of the walls bounding the annular channel having sound absorption structure disposed therein.

12. The stator assembly of claim 7 characterized further by at least one of the walls bounding the annular channel having sound absorption structure disposed therein.

13. The stator assembly of claim 8 characterized further by at least one of the walls bounding the annular channel having sound absorption structure disposed therein.

14. A stator assembly for a gas turbine engine having an axis of rotation $A_r$ and which has an annular flow path for working medium gases disposed about the axis of rotation which has a height $H_D$, the stator assembly extending circumferentially about the axis of rotation of the engine and bounding the flow path, comprising:

an outer wall extending circumferentially about the axis of rotation and outwardly bounding the annular flow path for working medium gases;

an inner wall spaced radially inwardly from the outer wall, the inner wall extending circumferentially about the axis of rotation and inwardly bounding the working medium gases;

an array of rotor blades, each rotor blade having a tip region and extending radially outwardly across the annular flow path such that the tip region is in close proximity with the outer wall, and having a chord length $b_r$ as measured in the axial direction;

an array of a number of stator vanes spaced axially downstream from the array of rotor blades, each stator vane extending radially outwardly from the inner wall across the annular flow path and having a chord length $b_v$ as measured in the axial direction and a radial span $S$ as measured at the leading edge, at least one of which is adapted to integrally attach an intermediate wall;

an array of a number of struts spaced axially downstream from the array of rotor blades, each strut extending radially inwardly from the outer wall across the annular flow path and being adapted to attach an intermediate wall;

a circumferentially extending intermediate wall spaced radially inwardly from the outer wall leaving an annular channel therebetween, the intermediate wall being integrally attached to and inwardly supported by at least one of said stator vanes extending radially across the annular flow path and being integrally attached to and outwardly supported by at least one of said struts extending across the annular channel, the intermediate wall having a length $L_w$, and a normalized length $L_n$ that is equal to the length of the intermediate wall divided by the axial chord of the stator vane ($L_n = L_w / b_v$);

said annular channel being outwardly bounded by the outer wall and inwardly bounded by the intermediate wall and extending axially from a location disposed between the blades and vanes and said channel extending radially and circumferentially and disposed entirely within the outermost twenty percent (20%) of the working medium flow path having an inlet spaced axially from the trailing edge of the rotor blades such that the distance between the rotor blades and the inlet to the annular channel is less than four chord lengths ($4b_r$) of the rotor blade, an axial length $L_C$ that is equal to the axial length of the intermediate wall $L_w$ ($L_C = L_w$), a radial height of the channel that is less than or equal to twenty percent (20%) of the height $H_D$ of the working medium flow path ($H_C \leq 0.20\ H_D$) perpendicular to the flow, a normalized height of the channel that is equal to the radial height of the channel divided by the radial span of the stator vane ($H_n = H_C/S$), a ratio of the actual axial length of the channel to the actual radial height of the channel being greater than 3 ($L_C/H_C > 3$), wherein the inner and outer wall of the annular channel capture turbulent flow discharged into the outer portion of the flow path from the tip region of the rotor blades, and wherein the number of struts is less than the number of vanes to provide a fewer number of radially extending surfaces upon which the flow may impact.

15. A method for forming a flow path for working medium gases for a gas turbine engine having an axis of rotation Ar, and an outer wall extending circumferentially about the axis of rotation outwardly bounding the flow path, comprising the steps of:

disposing a number of rotor blades in the gas turbine engine, each rotor blade having a tip region and extending across the flow path;

disposing a number of stator vanes in the gas turbine engine spaced axially downstream from the rotor blades, each stator vane extending across the flow path;

disposing a lesser number of struts as compared to said number of stator vanes in the gas turbine engine spaced axially downstream from the rotor blades, each strut extending across the flow path;

disposing an intermediate wall radially inwardly from the outer wall, said intermediate wall being inwardly supported by at least one of said stator vanes and outwardly supported by at least one of said struts; and forming a channel entirely within the radially outermost twenty percent (20%) of the working medium flow path between the outer wall and intermediate wall;

wherein sound energy discharged from the tip region of the rotor blades impacts on a number of radially extending surfaces of the struts which is less than the number of stator vanes.

* * * * *